United States Patent [19]

Sasaki et al.

[11] Patent Number: 4,974,743
[45] Date of Patent: Dec. 4, 1990

[54] FUEL TANK WITH NOISE SUPPRESSING ARRANGEMENT

[75] Inventors: Michiaki Sasaki, Hatano; Kinya Omura, Zama; Norio Sasaki, Sagamihara, all of Japan

[73] Assignee: Nissan Motor Company, Ltd., Japan

[21] Appl. No.: 313,681

[22] Filed: Feb. 22, 1989

[30] Foreign Application Priority Data

| Feb. 23, 1988 | [JP] | Japan | 63-21725[U] |
| Feb. 24, 1988 | [JP] | Japan | 63-22341[U] |
| Mar. 1, 1988 | [JP] | Japan | 63-25899[U] |
| Mar. 2, 1988 | [JP] | Japan | 63-26832[U] |
| Mar. 2, 1988 | [JP] | Japan | 63-26833[U] |
| Mar. 7, 1988 | [JP] | Japan | 63-29159[U] |
| May 18, 1988 | [JP] | Japan | 63-64427[U] |

[51] Int. Cl.$^5$ ............................................. B65D 8/04
[52] U.S. Cl. .................................... 220/1 B; 220/1 V; 220/5 A; 220/905; 220/DIG. 24
[58] Field of Search ............... 220/1 B, 1 V, 5 R, 5 A, 220/905, DIG. 24

[56] References Cited

U.S. PATENT DOCUMENTS

| 2,239,507 | 4/1941 | Pierce | 220/DIG. 24 |
| 2,552,119 | 5/1951 | Scharenberg | 220/905 |
| 3,400,854 | 9/1968 | Conaway et al. | |
| 4,026,503 | 5/1977 | Rhodes | 220/1 B |
| 4,615,452 | 10/1986 | Lederer et al. | 220/1 B |

FOREIGN PATENT DOCUMENTS

| 2357106 | 11/1975 | Fed. Rep. of Germany . |
| 2847117 | 8/1988 | Fed. Rep. of Germany . |
| 54-22807 | 8/1979 | Japan . |
| 2088806 | 6/1982 | United Kingdom . |

Primary Examiner—Joseph Man-Fu Moy
Attorney, Agent, or Firm—Lowe, Price, LeBlanc, Becker & Shur

[57] ABSTRACT

A fuel tank comprises a container having a chamber adapted to receive a body of liquid fuel and wall means defining said chamber, and a structure with a number of voids, said structure being so constructed and arranged within said chamber as to provide an arrangement wherein when said structure is exposed to the body of liquid fuel, said number of voids work to dissipate energy of waves created on the surface portion of the body of liquid fuel.

32 Claims, 24 Drawing Sheets

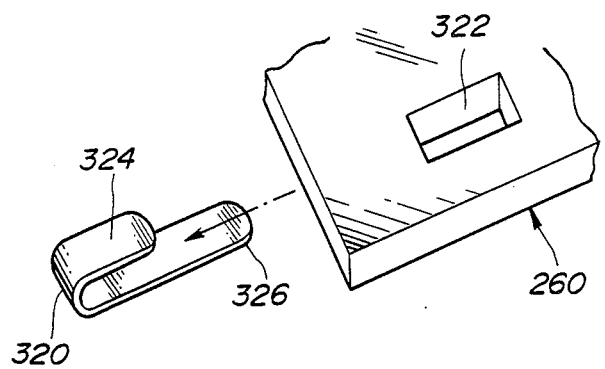
FIG.49
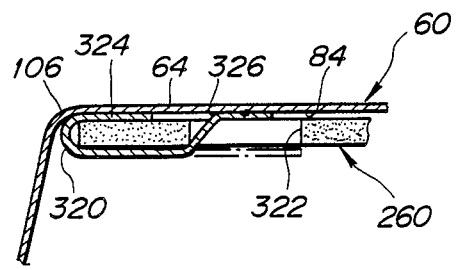
FIG.50
FIG.51
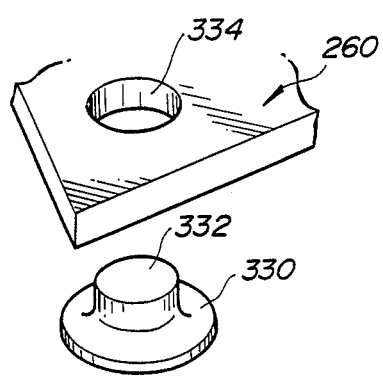
FIG.52
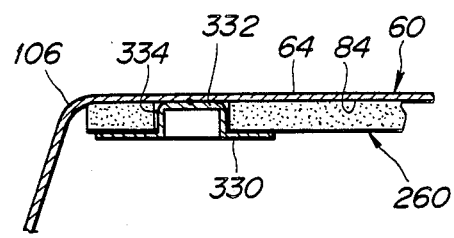

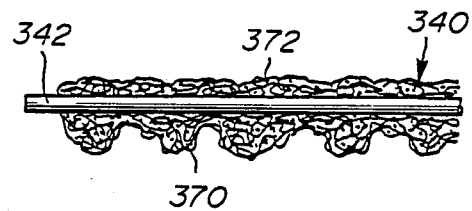
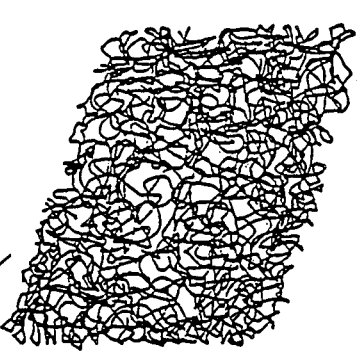
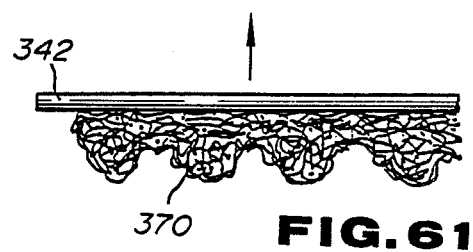
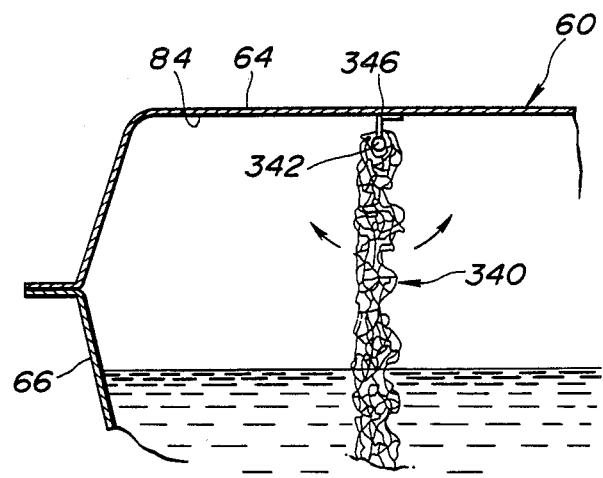

FUEL TANK WITH NOISE SUPPRESSING ARRANGEMENT

BACKGROUND OF THE INVENTION

The present invention relates to a noise suppressing arrangement of a fuel tank mounted on a vehicle.

Japanese Utility Model Application Provisional Publication No. 54-22807 discloses a fuel tank wherein in order to restrain movement of liquid fuel within a container, a baffle plate structure including a plurality of steel plates which have their upper flanges spot welded to an upper inner wall of the container. When the vehicle starts or decelerates, the liquid fuel tends to move in the longitudinal direction of the vehicle and this longitudinal movement of the liquid fuel is impeded by these steel plates, decreasing force which the liquid fuel impinges against the inner wall of the container, thus decreasing noise occurring upon this impingement. This known fuel tank has a problem that the spot welded portions are subject to a great stress since the baffle plate structure that is rigid withstands against the rapid movement of the liquid fuel. Therefore, in order to prevent crack initiation of the container due to the concentration of the load, it is impossible to reduce the thickness of the container below a predetermined value. There is the limit to reduction of weight of the fuel tank.

An object of the present invention is to provide a fuel tank which is improved such that, without any considerable reduction in capacity of a container of the fuel tank and without any considerable increase in weight of the fuel tank, a force with which liquid fuel impinges upon the inner wall of the container is reduced to reduce the noise level caused by this impingement, and waves on the surface of the liquid fuel are dissipated and disappear.

SUMMARY OF THE INVENTION

According to the present invention, there is provided a fuel tank comprising:

a container having a chamber adapted to receive a body of liquid fuel and wall means defining said chamber; and a structure with a number of voids, said structure being so constructed and arranged within said chamber as to provide an arangement wherein when said structure is exposed to the body of liquid fuel, said number of voids work to dissipate energy of waves created on the surface portion of the body of liquid fuel.

BRIEF DESCRIPTION OF THE DRAWINGS

FIG. 49 is a fragmentary exploded view of an attachment plate and a baffle;

FIG. 50 is a fragmentary section showing the assembled state of the attachment plate and the baffle shown in FIG. 49;

FIG. 51 is a fragmentary exploded view of an attachment plate and a baffle;

FIG. 52 is a fragmentary section showing the assembled state of the attachment plate and the baffle shown in FIG. 51;

FIGS. 60, 61, and 62 illustrate a process to increase integrity between a baffle and a cable used to support the baffle; and FIG. 63 is a fragmentary perspective view of a container similar to FIG. 14 illustrating a modification.

DETAILED DESCRIPTION OF THE INVENTION

Figure 1:
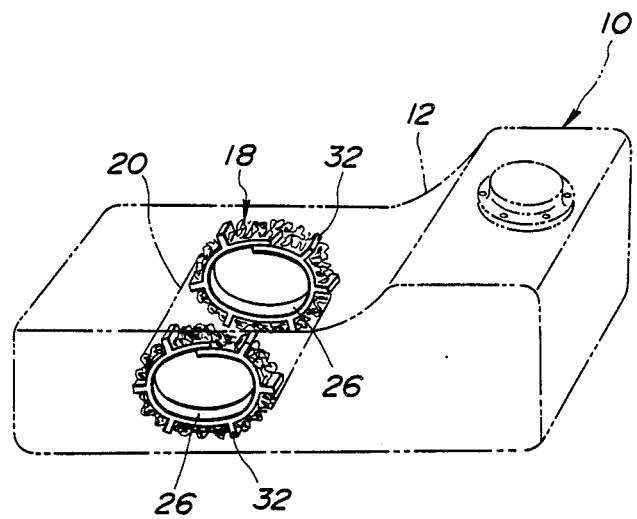
FIG. 1 is a perspective view of a first embodiment of a fuel tank shown in phantom, illustrating a structure arranged within a chamber of the fuel tank, with its middle portion removed to show end portions of the structure.
Figure 2:
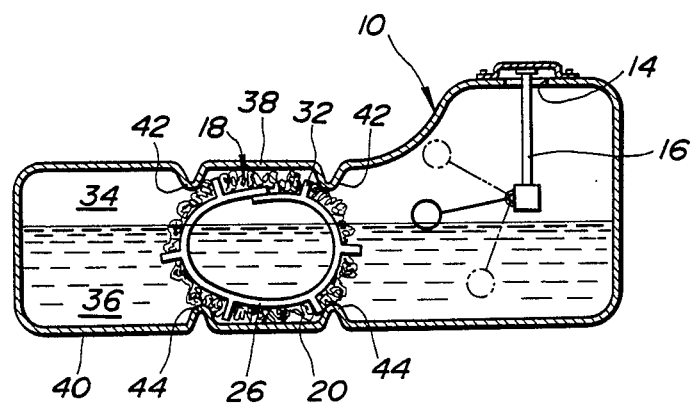
FIG. 2 is a section of the fuel tank taken along the longitudinal axis of a vehicle which the fuel tank is mounted on, illustrating the end portion of the structure arranged within the container.

Referring to FIGS. 1 and 2, there is shown a fuel tank generally denoted by the reference numeral 10 which is mounted on a four-wheel drive vehicle under a floor panel of a rear seat. This fuel tank 10 comprises a container 12 made of plastic. The container 12 is of a general box shape and has a rear end portion with respect to a forward travel direction of the vehicle, namely righthand end portion as viewed in FIGS. 1 and 2, and a front end portion, namely lefthand end as viewed in FIGS. 1 and 2. The height of the rear end portion is greater than that of the front end portion. The rear end portion is formed with a hole 14 through which a fuel gauge 16 is inserted into the container 12.

Figure 3:
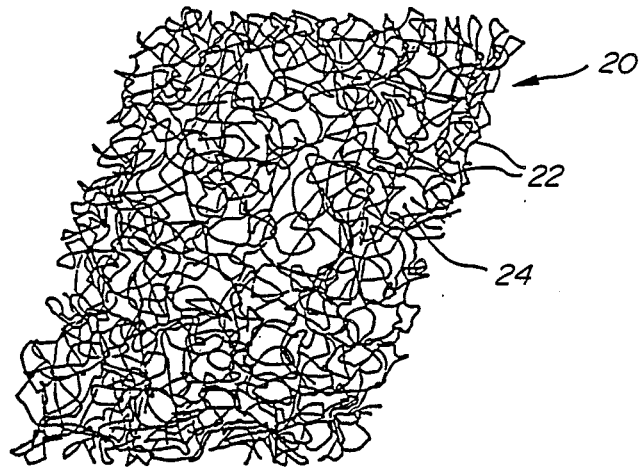
FIG. 3 is a perspective view of a sheet made of a number of curled synthetic resin fibers intermingled, which sheets are used to form a baffle of the structure.
Figure 4:
FIG. 4 is a side elevation of the sheet as viewed from the righthand side in FIG. 3.
Figure 5:
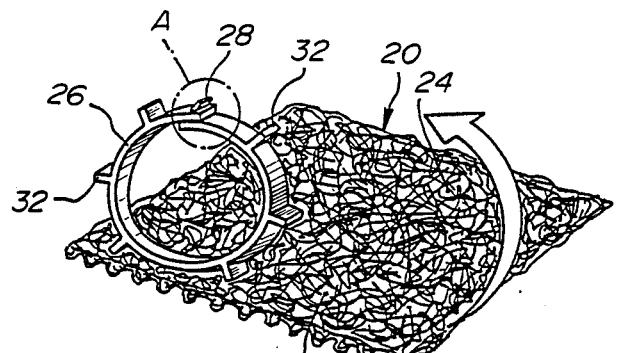
FIG. 5 illustrates how the sheet as shown in FIG. 3 encircles a looped elastic band.
Figure 6:
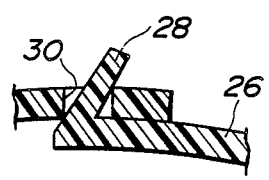
FIG. 6 is a section of a fragmentary portion (enclosed by a one-dot-chain line drawn circle in FIG. 5) of the looped elastic band, illustrating how the elastic band has one end engaged in the other end to form a loop.

Arranged within the container 12 is a structure generally denoted by the reference numeral 18. As shown in FIG. 1, this structure 18 extends laterally with respect to the forward travel direction of the vehicle, and has a baffle 20 that is formed from a sheet of synthetic resin fibers 22 intermingled. As seen in FIG. 3, the synthetic resin fibers 22 are curved or curled and intermingled to define a great number of voids 24. The material of the synthetic resin fibers 22 may be polypropylene or polyethylene or nylon or the like. As will be understood from FIGS. 3 and 4, the baffle sheet 20 has a flat surface on one side and a corrugated surface on the opposite side. The structure 18 also has a plurality of looped elastic bands 26. As diagrammatically shown in FIG. 5, the baffle sheet 20 encircles the looped elastic bands 26 with its corrugated surface out to form a tubular shape. Each of the looped elastic bands 26 is formed by looping an elongated band with a hook 28 formed on one end engaged in a hole 30 formed through the opposite end as best seen in FIG. 6. Each of the looped elastic bands 26 has a plurality of projections 32 on the outer periphery of its loop. The plurality of such projections 32 engage in voids 24 of the baffle sheet 20, thus retaining the tubular shape of the baffle sheet 20.

Referring back to FIG. 2, the container 12 of the fuel tank 10 has a chamber 34 receiving a body of liquid fuel 36, such as a diesel fuel or a gasoline fuel, and walls defining the chamber 34. The walls include an upper wall 38, and a lower wall 40 that is opposed to the upper wall 38. The structure 18 is held stationary between the opposed walls 38 and 40. The baffle 20 is fixed to the opposed walls 38 and 40 due to heat during process of forming the container 12. The looped elastic bands 26 are compressed to bias the baffle 20 into firm engagement with the upper and lower walls 38 and 40. In order to prevent movement of the structure 18 after a long use, the upper wall 38 is formed with a pair of spaced projections 42, while the lower wall 40 is formed with a pair of spaced projections 44. Preferably, the projections 32 of the looped elastic bands 26 are long enough to extend through the baffle 20, so that these projections 32 can engage the projections 42 and 44 to limit movement of the structure 18.

If the vehicle starts or decelerates, the fuel within the container 12 of the fuel tank 10 moves considerably. Thus, the fuel impinges upon the baffle 20 and passes through the number of voids 24 which the baffle 20 is formed with. During the process of passing through the voids 24, the energy of waves is dissipated and the waves disappear or at least decrease. Since air is entrapped in some of the voids 24 during the impingement of the fuel with the baffle 20, the entrapped air works effectively to eliminate waves. As a result, a force with which the fuel impinges upon the walls is considerably decreased, thus suppressing the level of sound owing to this impingement.

Let us now consider the case where the surface of the body of liquid fuel 36 is elevated to the full level. If, in this case, the vehicle starts or decelerates, the fuel moves and impinges upon the upper portion of the baffle 20 before impinging upon the upper wall 38. Under this condition, air caught in some of the voids 24 forms a closed air layer in cooperation with the upper wall 38, inducing an elastic force acting against the movement of the fuel. Thus, the force with which the fuel impinges upon the upper wall 38 is reduced by the closed air layer, suppressing the level of sound caused by the impingement of the fuel upon the upper wall 38. During ordinary running of the vehicle, waves are generated in the surface of the body of fuel 36. These waves are dissipated by the voids 24 of the baffle 20 and thus disappear. Thus, the level of sound caused by impingement of such waves upon the upper wall is suppressed.

Since the baffle 20 of the structure 18 extends from the upper wall 38 down to the lower wall 40, the level of sound caused by impingement of waves upon the walls is suppressed even if the fuel remaining in the container 12 decreases.

Figure 7:
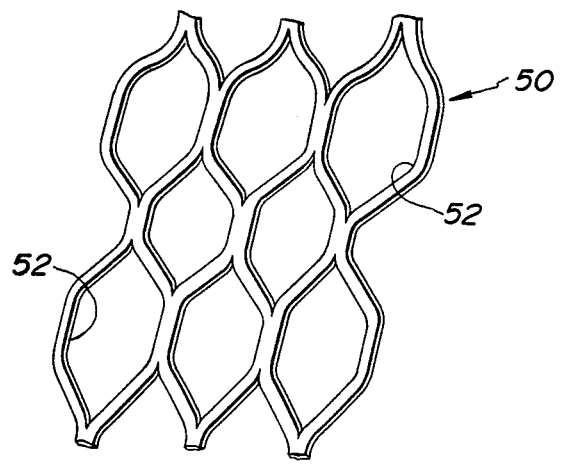
FIG. 7 is a fragmentary view of an alternative to the sheet.

An alternative to the baffle 20 is shown in FIG. 7 and generally denoted by the reference numeral 50. Referring to FIG. 7, the baffle 50 is formed from a sheet of synthetic resin formed with a great number of slits which when opened make meshes that serve as voids 52. This sheet is corrugated to give a desired thickness and then encircles the looped elastic bands to form the structure similar to that shown in FIGS. 1 and 2.

Figure 8:
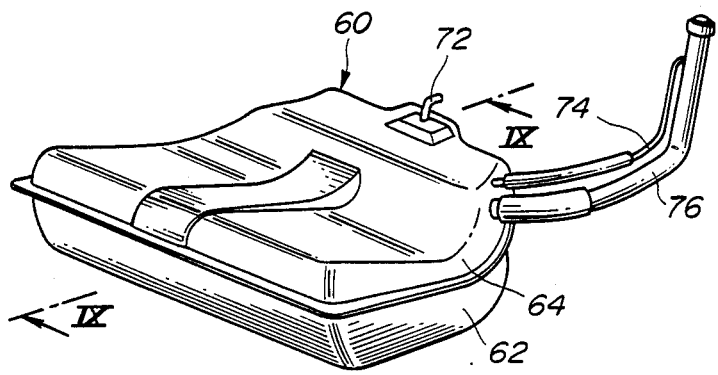
FIG. 8 is a perspective view of another embodiment of a fuel tank according to the present invention.

Referring to FIGS. 8 to 13, a further embodiment of a fuel tank according to the present invention is described. Referring particularly to FIG. 8, there is shown a fuel tank 60 formed of steel. The fuel tank 60 comprises a container 62 that includes an upper shell 64 and a lower shell 66. The upper and lower shells 64 and 66 have flanges which are overlapped and secured by welding. The container 62 of the fuel tank 60 is designed for mounting under a rear seat of a four-wheel drive vehicle. Thus, the upper shell 62 has an upper outer wall 68 that is gradually inclined and wide enough to support a seat cushion.

Figure 9:
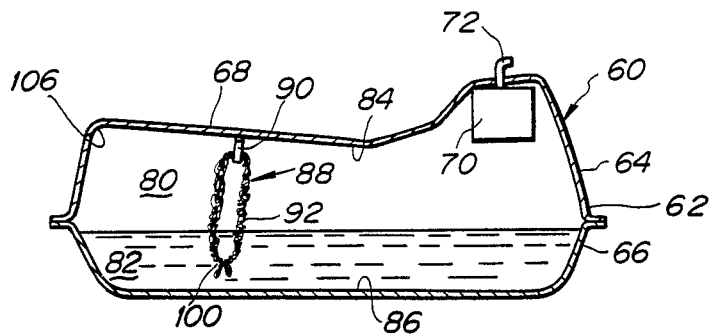
FIG. 9 is a section taken through the line IX—IX shown in FIG. 8 and illustrates one state.
Figure 10:
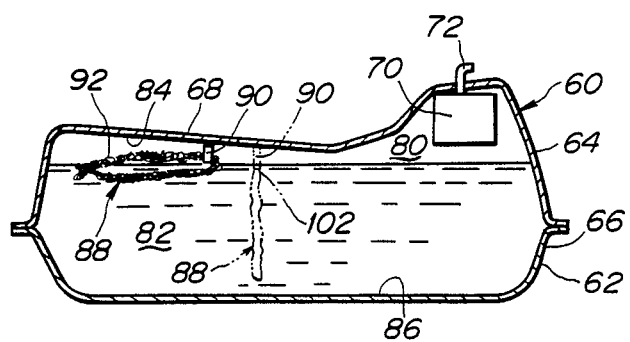
FIG. 10 is a similar view to FIG. 9 but illustrating a different state.

Referring also to FIGS. 9 and 10, the container 62 is provided with an opening 70a which an evaporation tube 72 communicates with, and openings for a ventilation tube 74 and a fuel filler tube 76. It is also provided with a fuel gauge, not shown. The container 62 has a chamber 80 for receicing a body of liquid fuel 82 and walls defining the chamber 80. The walls include an upper inner wall 84 and a lower inner wall 86.

Figure 11:
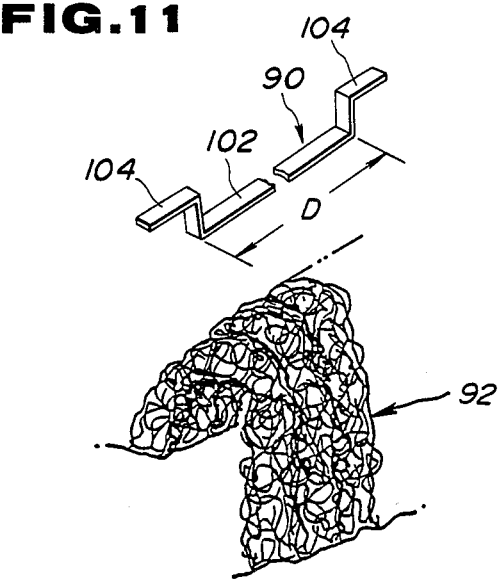
FIG. 11 is a perspective view showing the structure of a bracket which rotatably supports a baffle.
Figure 12:
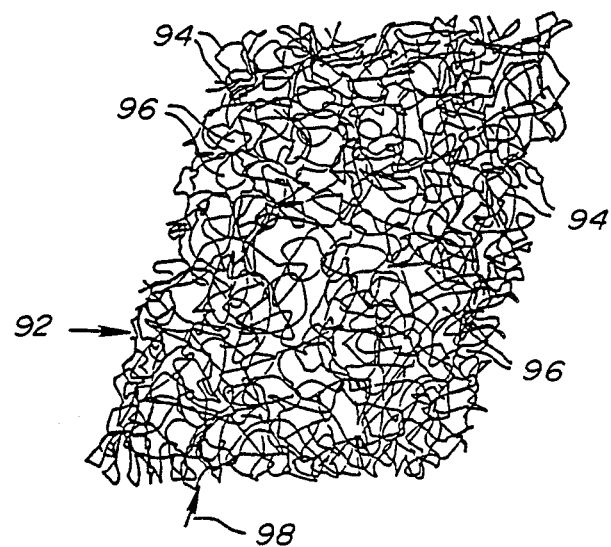
FIG. 12 is a perspective view of the structure of the baffle.
Figure 13:
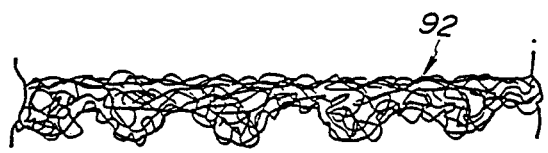
FIG. 13 is an enlarged fragmentary view veiwing the structure shown in FIG. 12 in a direction along an arrow 98.

The fuel tank 60 comprises a structure 88 arranged within the chamber 80. The structure 88 has a bracket 90 as best seen in FIG. 11 secured to the upper inner wall 84 and a baffle 92 that is formed from a sheet made of a number of synthetic resin fibers 94 intermingled as shown in FIG. 12. As best seen in FIG. 12, the synthetic resin fibers 94 are intermingled to define a number of voids 96. As viewing the sheet shown in FIG. 12 in a direction along an arrow 98, the sheet has one side corrugated. The sheet is bended with the opposite ends thereof meeting with each other and secured by a clip 100. The bracket 90 rotatably supports the baffle 92 at its bended portion thereof.

As best seen in FIG. 11, the bracket 90 has a bar 102 and two flanges 104 extending from the opposite ends of the bar 102. The bracket 90 is secured to the upper inner wall 84 with their flanges 104 welded to the upper inner wall 84. The setting is such that the length D of the bar 102 is shorter than the width of the container 62 and the width of the baffle 92 is substantially the same as the length D of the bar 102.

The specific gravity of the synthetic resin fibers 94 is similar to that of the liquid fuel. The voids 96 are encircled by the fuel film to catch air inside the voids 96 when the baffle 92 is disposed in the body of the liquid fuel 82. Thus, air layer is formed by air catched by the voids 96, inducing a buoyant force. In addition to this function, the voids 96 function to dissipate energy of waves of fuel, causing the wave to disappear.

With the baffle 92 with buoyancy function, the baffle 92 moves from the position as illustrated in FIG. 9 to the position as illustrated in FIG. 10 as the level of the body of liquid fuel 82 increases.

With the arrangement according to this embodiment, if the level of the surface of the body of liquid fuel 82 is of a middle level, the baffle 92 extends vertically. Thus, waves generated when the vehicle starts or decelerates are dissipated by the voids 96 of the baffle 92 and disappear. Thus, the level of sound due to the impingement of such waves upon the walls is suppressed. If the level of the surface of body of liquid fuel increases to the fuel fill level, the baffle 92 extends generally horizontally near the upper inner wall 84. Since the baffle 92 is rotatably supported by the bracket 90, the baffle 92 can move smoothly from the vertical position thereof to the horizontal position thereof without inducing any local stress on the bracket 90. Under this condition, let us now consider the case when the vehicle is subject to a great deceleration. In FIGS. 9 and 10, the fuel tank 60 is subject to a force directed to the right and thus the liquid fuel moves to the left to press the baffle 92 toward the upper inner wall 84. Thus, the waves are dissipated by the voids 96 and the level of the sound due to the impingement of the fuel upon the upper inner wall 84 is further suppressed owing to an air layer trapped between the baffle 92 and the upper inner wall 84. The baffle 92 covers a portion of the upper inner wall 84, so that the level of sound due to impingement of waves upon the upper inner wall 84 is suppressed since the waves will not impinge upon the upper inner wall 84 where the baffle 92 covers.

Figure 14:
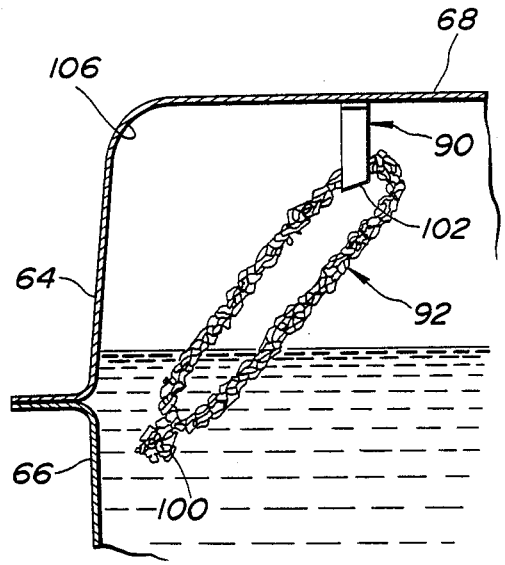
FIG. 14 is a fragmentary enlarged sectional view of a container illustrating a modified embodiment.

It is confirmed that substantial level of sound is generated when the liquid fuel impingers upon a so-called coner portion as denoted by the reference numeral 106 in FIG. 9. Thus, it is preferrable to mount the baffle 92 at a portion near the corner portion 106 as shown in FIG. 14 in order to effectively suppress the level of sound. As shown in FIG. 14, a bar 102 of a bracket 90 is tapered to ensure that the free end of the baffle 92 swings to the travel direction of the vehicle, namely to the left as viewed in FIG. 14.

Although the baffle 92 is in the form of a looped sheet with its corrugated side out, it is possible to bend the sheet to close the loop to make a plate like configuration as shown by the phantom line in FIG. 10.

Figure 15:
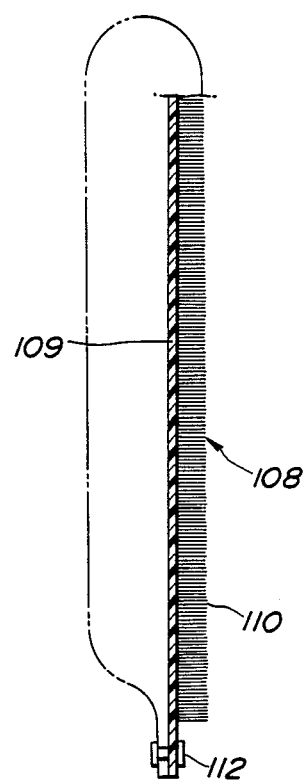
FIG. 15 is a fragementary sectional view of another structure of the baffle.

An alternative to the baffle 92 is illustrated in FIG. 15. As fragmentary shown in FIG. 15, a baffle 108 is formed by looping a sheet 109 with one side surface echinated with a number of synthetic resin needles 110. This sheet 109 is bended with its echinated surface out and its opposite ends meething with each other and secured by a pin 112.

Figure 16:
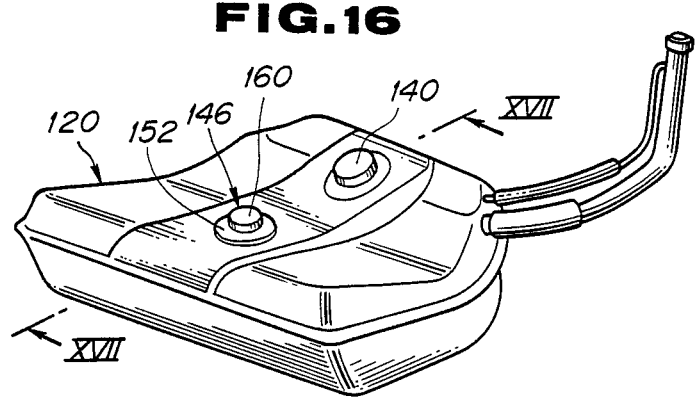
FIG. 16 is a perspective view similar to FIG. 8 illustrating a further embodiment.
Figure 17:
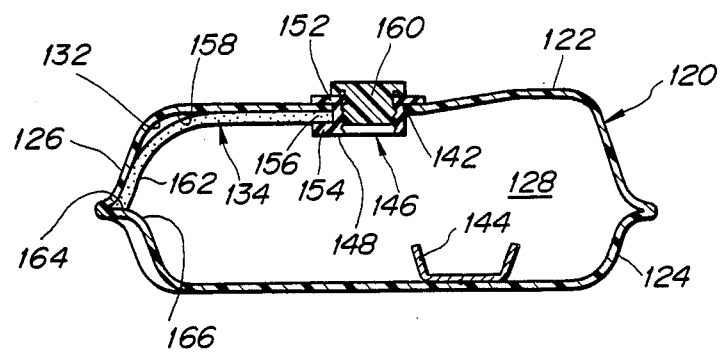
FIG. 17 is a section taken through the line XVII—XVII shown in FIG. 16.
Figure 18:
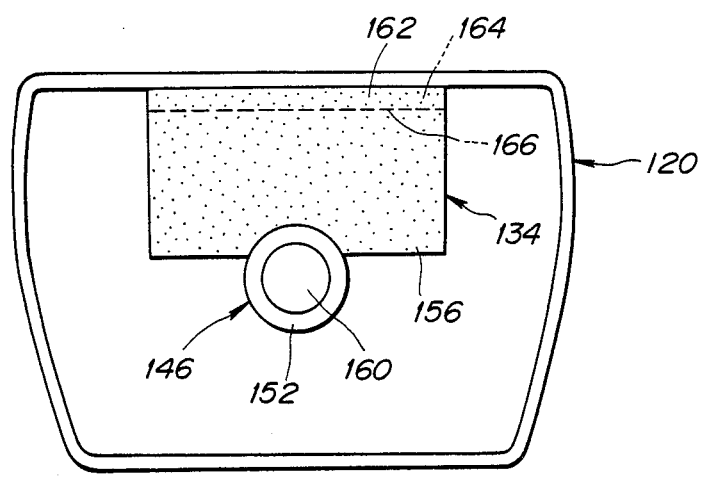
FIG. 18 is a bottom view of an upper shell of the fuel tank with a lower shell removed.

Referring to FIGS. 16 to 21, a still further embodiment is described. In this case, the present invention is embodied in a fuel tank 120 made of a synthetic resin as shown in FIGS. 16 to 18. The fuel tank 120 is formed of an upper shell 122 and a lower shell 124 integrated during the process of blow forming, and it is designed for use in a four-wheel drive vehicle as being mounted under a floor panel of a rear seat of the vehicle.

The fuel tank 120 comprises a container 126 having a chamber 128 adapted to receive a body of liquid fuel, not shown, and walls defining the chamber 128. These walls includes an upper front corner wall portion 132. Arranged within the chamber 128 of the container 126 is a plate like rectangular baffle 134. The material of the baffle 134 is substantially the same as that of the counterpart used in the preceding embodiments.

Figure 20:
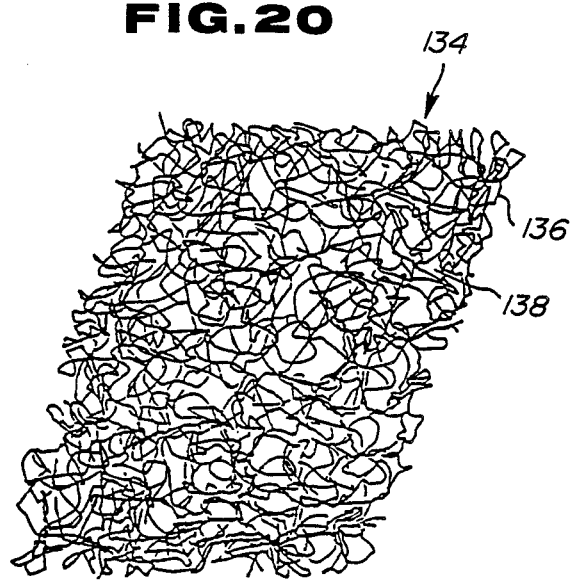
FIG. 20 is a perspective view of a structure of the baffle.

FIG. 20 is a perspective view of the baffle 134. As shown, the baffle 134 is made of a number of synheric resin fibers 136 intermingled. Thus, a number of voids 138 are defined which serve as means for dissipating waves of generated on the surface of the body of liquid fuel. The baffle 136 has a surface corrugated.

Referring back to FIG. 16, the upper shell 122 of the container 126 is provided with a fuel gauge unit 140. As best seen in FIG. 17, the upper shell 122 is formed with a work hole 142 through which a variety of component parts are inserted into the chamber 128. A saucer 144 is inserted into the chamber 128 and fixed to the inner lower wall of the lower shell 124 using this work hole 142.

Figure 19:
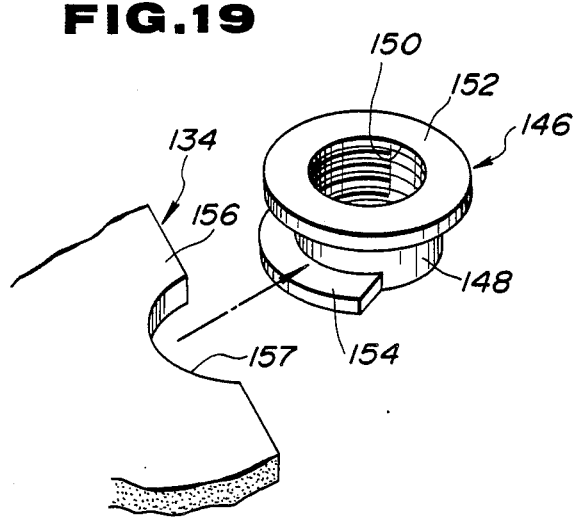
FIG. 19 is a fragmentary exploded view of a retainer and a baffle.

The baffle 134 is arranged within the chamber 128 to cover the corner wall portion 132. A cylindrical retainer 146 is fitted in the work hole 142. As best seen in FIG. 19, the retainer 146 includes a tubular portion 148 with its inner cylindrical wall 150 tapped, and an upper flange 152. It also includes a lower flange 154 that is cutout to allow easy insertion of the retainer into the chamber 128.

The baffle 92 has one side 156 formed with an semicircular cutout 157. As best seen in FIGS. 17 and 18, the one side 156 is inserted between the lower flange 154 and an upper inner wall 158 with the semicircular cutout 156 receiving the tubular portion 148, and thus interposed between the lower flange 154 and the upper inner wall 158. A cap 160 threadedly engages the inner cylindrical wall 150 to close the tubular portion 148.

Figure 21:
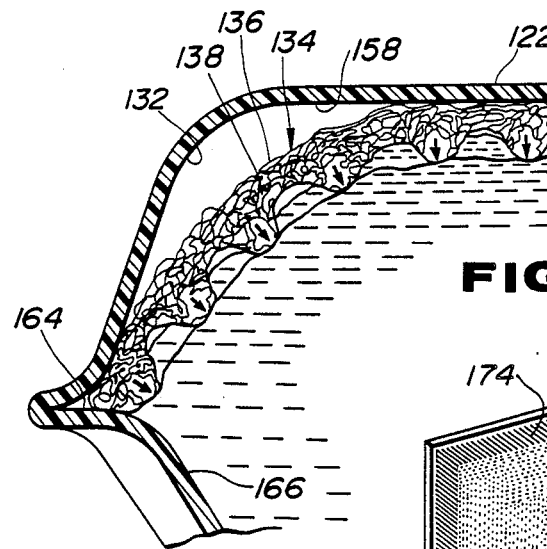
FIG. 21 is a fragmentary enlarged section of FIG. 17 illustrating a modification using the structure shown in FIG. 20.

As best seen in FIGS. 1 and 21, the baffle 134 is curved along the corner portion 132 with its opposite side edge 162 abuttingly engageing with a shoulder portion 164 formed an inwardly protruded portion 166 of the lower shell 124. With its elasticity, the one side edge 156 is pressed against the tubular portion 148, while the opposite side edge 162 is pressed against the shoulder portion 164.

FIG. 21 is a fragmentary enlarged view of FIG. 17. As shown in FIG. 21, the corrugated side of the baffle 134 faces inwardly so that a great number of voids 138 can exposed to the fuel within the container 126.

Figure 22:
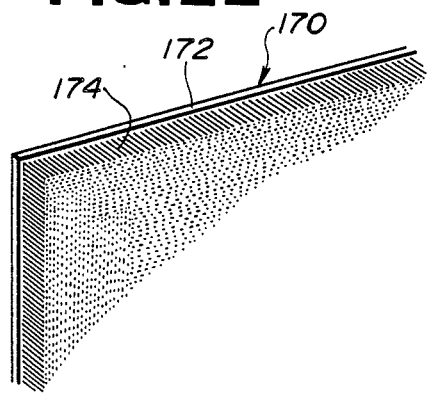
FIG. 22 is a fragmentary view illustrating another structure of the baffle.
Figure 23:
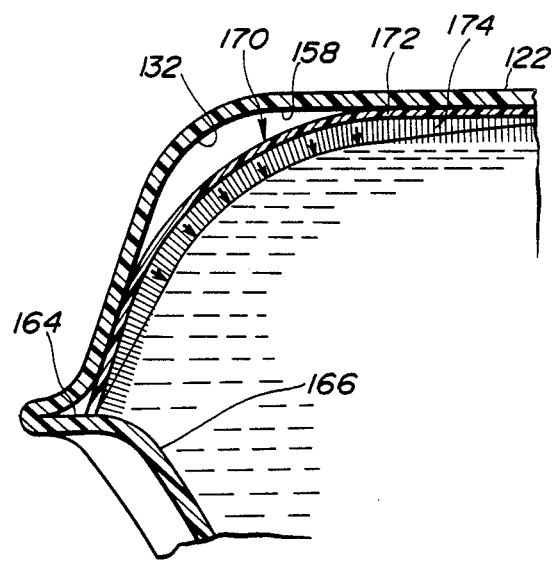
FIG. 23 is a view similar to FIG. 21 illustrating a modification using the structure shown in FIG. 22.

FIG. 22 shows a modification 170 alternative to the baffle 134, and FIG. 23 shows how the modified baffle 170 is mounted to cover a coner wall portion 132. This modified baffle 170 includes a sheet 172 with one surface echinated with a number of synthetic resin needles 174.

Figure 24:
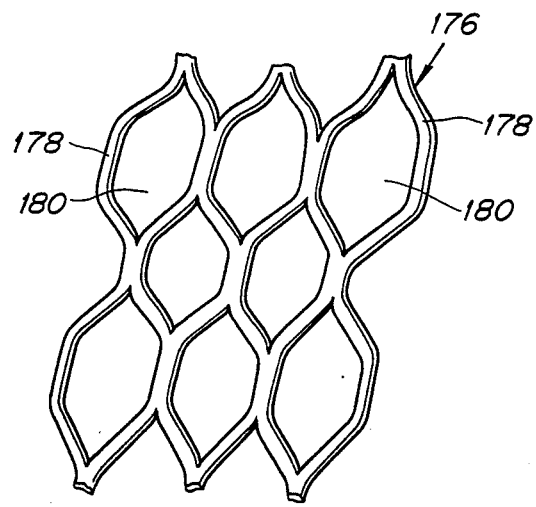
FIG. 24 is a fragmentary view illustrating still another structure of the baffle.
Figure 25:
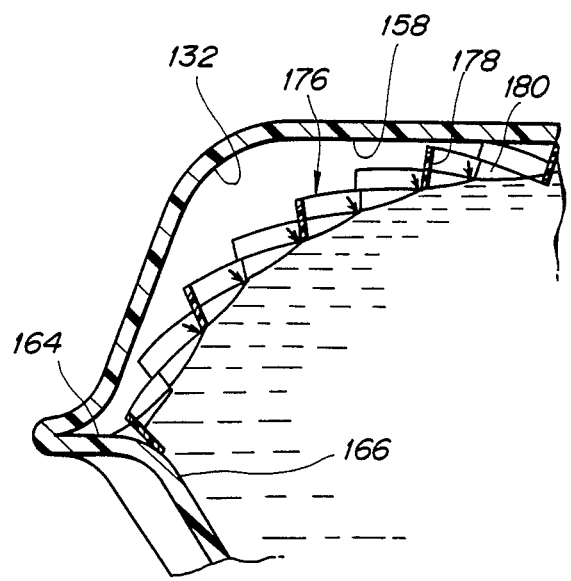
FIG. 25 is a similar view to FIG. 23 illustrating a modification using the structure shown in FIG. 24.

FIG. 24 is another modification 176 alternative to the baffle 134, and FIG. 25 is a view similar to FIG. 23 illustrating how the modified baffle 176 is mounted to cover a corner wall portion 132. As shown in FIG. 24, the baffle 176 is in the form of a sheet 178 of synthetic resin formed with a number of slits which when opened make voilds 180.

Figure 26:
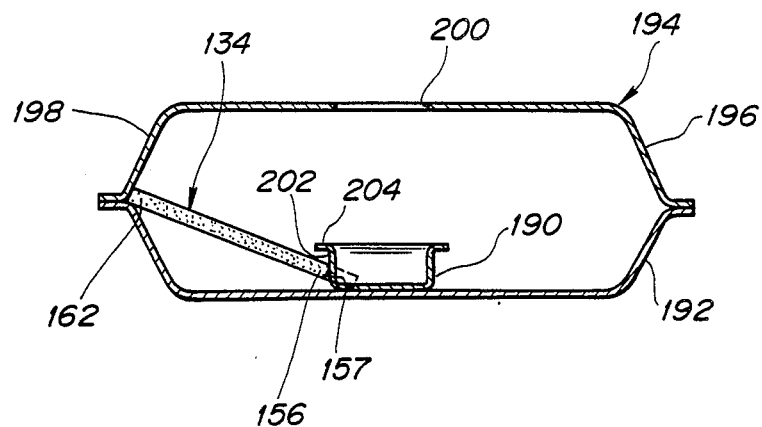
FIG. 26 is a diagrammatic section of a container of a fuel tank illustrating a further embodiment.
Figure 27:
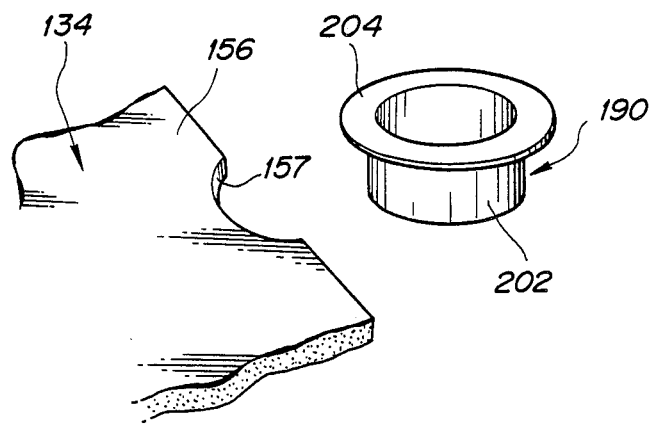
FIG. 27 is a fragmentary exploded view of a saucer with a tubular portion and a baffle.
Figure 28:
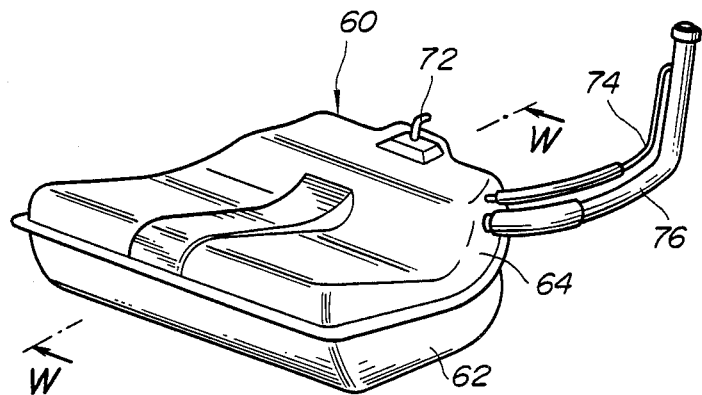
FIG. 28 is a perspective view similar to FIG. 8 illustrating a further embodiment.
Figure 29:
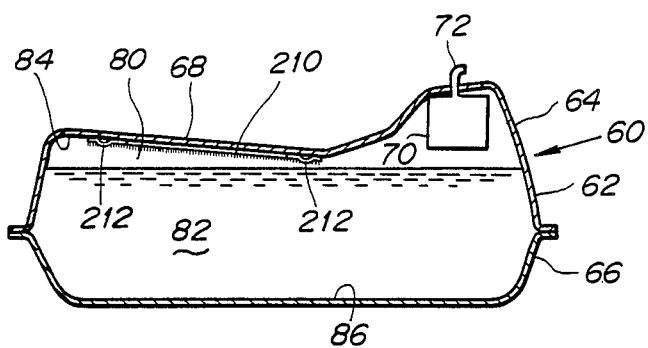
FIG. 29 is a section taken through the line W—W in FIG. 28.

Referring to FIGS. 26 and 27, a still further embodiment is explained wherein a baffle 134 is mounted using a saucer 190 welded to a lower shell 192 of a fuel tank 194 made of steel. The fuel tank 194 also includes an upper shell 196 welded to the lower shell 192 to form a container 198. The upper shell 196 is formed with a work hole 200 though which the above-mentioned saucer 190 is inserted and welded to the inner wall of the lower shell 192. The saucer 190 has a tubular portion 202 which a semicircular cutout 157 engages with. The saucer 190 is formed with a flange 204 for securing this engagement of the baffle 134 with the tubular portion 202 of the saucer 190. The baffle 134 has its opposite side edge 162 resting on the upper end portion of the lower shell 192. This opposite side edge 162 is securely held between the upper end portion of the lower shell 192 and the lower end portion of the uppert shell 196 during the process of welding the upper shell 196 to the lower shell 192.

Figure 30:
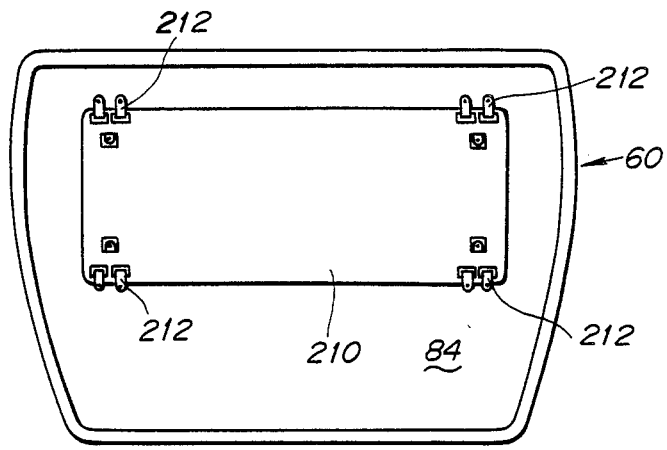
FIG. 30 is a bottom view of an upper shell with a lower shell removed.

Referring to FIGS. 28 to 31, a still further embodiment is described wherein the present invention is embodied in a fuel tank similar to the before described fuel tank 60 in connection with FIGS. 8 to 10. According to this embodiment, a plate like baffle 210 is mounted on an upper inner wall 84 of a container 62 by means of four attachment plates 212. As best seen in FIG. 30, the attachment plates 212 are used to securely anchor four coner portions of the baffle 210 to the upper inner wall 84 of the container 62.

Figure 31:
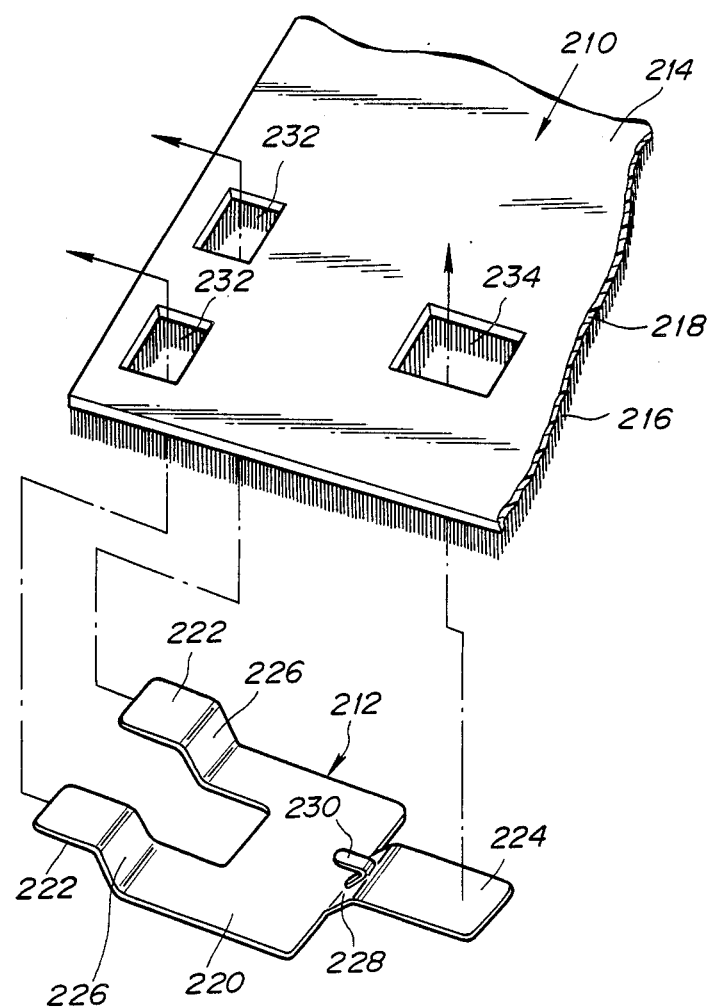
FIG. 31 is a fragementary exploded view of an attachment plate and a baffle.

Referring particularly to FIG. 31, the baffle 210 includes a sheet or substrate 214 with one side surface echinated with a number of synthetic resin needles 216. The needles 216 define therebetween voids 218. The attachment plate 212 is made of steel and includes a main support plate portion 220 adapted to support the baffle 210 and a plurality of, three in this embodiment, legs 222 and 224. Two parallel legs 222 extend in the same firection from one end of the main support plate portion 220 and connect therewith via vertical portions 226, while the single leg 224 extends in the opposite direction from the opposite end of the main support portion 220 and connect therewith via a vertical portion 228. A portion of the vertical portion 228 is cut out to form a claw 230. The setting is such that the height of each of the vertical portions 226 and 228 is slightly less than the unstress thickness of the baffle 210 so that the main support plate portion 220 can bias the baffle 210 toward the upper inner wall 84 of the container 62.

The baffle 210 is formed with a pair of through holes 232 and a single through hole 234. With the vertixcal portions 226 inserted through the holes 232 and the vertical portion 228 inserted through the hole 234 as indicated by arrows, the legs 222 and 224 are secured to the upper inner wall 84 by spot welding.

In this manner, the baffle 210 is mounted on the upper inner wall 84 to cover a front portion of the upper inner wall 84.

Figure 32:
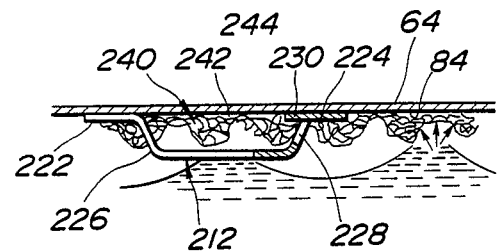
FIG. 32 is a fragmentary section showing a modification using a baffle as shown in FIG. 33.
Figure 33:
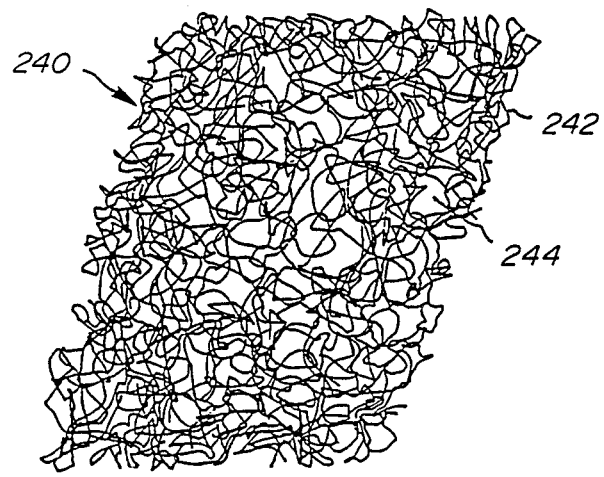
FIG. 33 is a fragmentary perspective view illustrating a structure of the baffle.

If, for example, a baffle 240 formed of a number of synthetic resin fibers 242 intermingled as shown in FIG. 33 is used, this baffle 240 can be mounted on an upper inner wall 84 without special holes since vertical portions 226 and 228 can extend through voids 244 defined between the synthetic resin fibers 242 as shown in FIG. 32.

Figure 34:
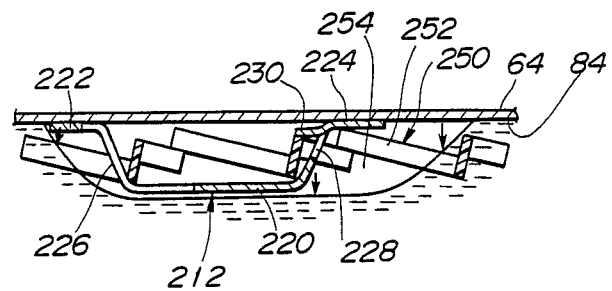
FIG. 34 is a similar view to FIG. 32 using a baffle as shown in FIG. 35.
Figure 35:
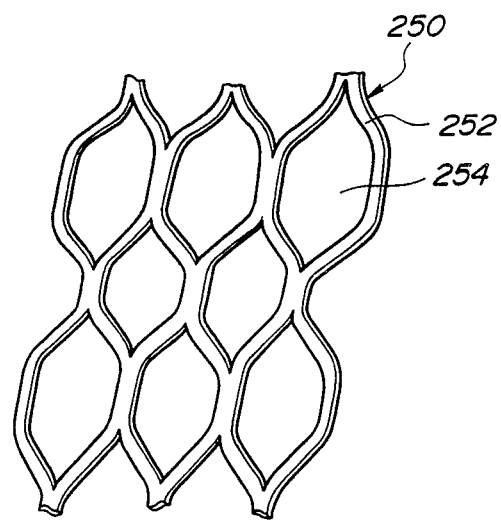
FIG. 35 is a fragmentary perspective view illustrating another structure of the baffle.
Figure 36:
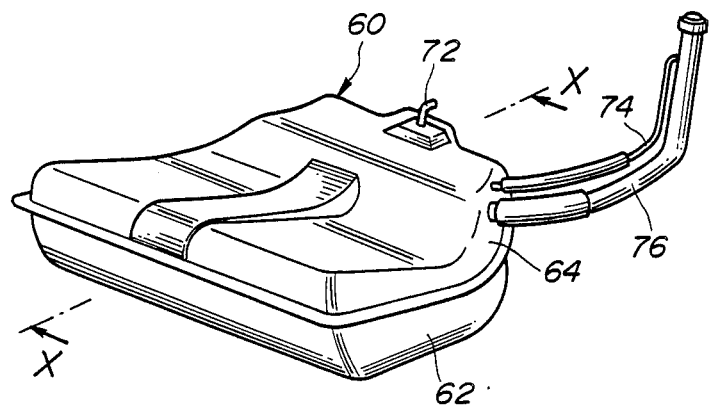
FIG. 36 is a perspective view similar to FIG. 8 illustrating a further embodiment.
Figure 37:
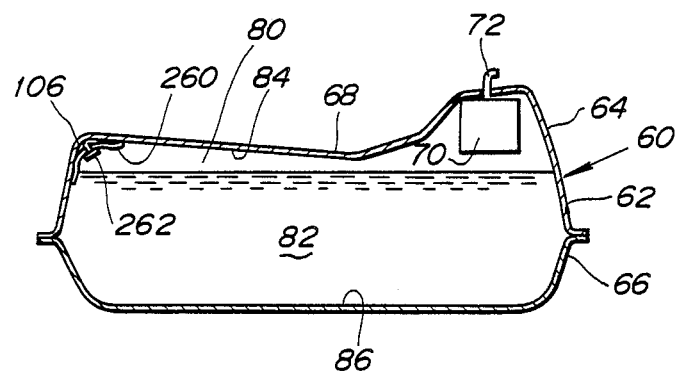
FIG. 37 is a section taken through the line X—X shown in FIG. 36.

If there is used a baffle 250 formed of a sheet 252 of synthetic resin with a number of voids 254, this baffle 250 can be mounted on an upper inner wall 84 by using some of the voids 254 for vertical portions 226 and 228 of an attachment plate 212 to extend therethrough as shown in FIG. 34.

Figure 38:
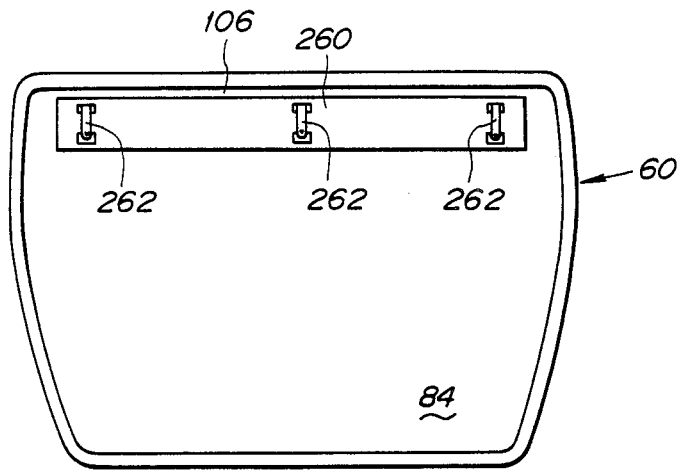
FIG. 38 is a bottom view of an upper shell with a lower shell removed.

Referring to FIGS. 36 to 40, a still further embodiment is described wherein the present invention is embodied in a fuel tank similar to the before described fuel tank 60 in connection with FIGS. 8 to 10. According to this embodiment, a plate like elongate baffle 210 is mounted on a front corner portion 106 of an upper inner wall 84 of a container 62 by means of three attachement plates 262. As best seen in FIG. 38, the attachment plates 262 are used to securely anchor three portions of the baffle 260 to the corner portion 106 of the upper inner wall 84 of the container 62.

Figure 39:
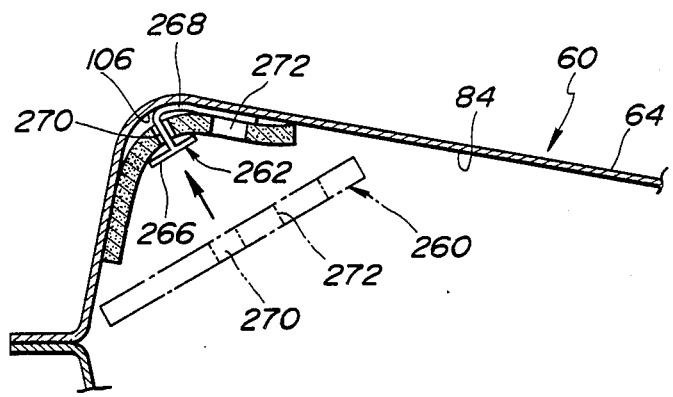
FIG. 39 is a fragmentary section of a container of a fuel tank illustrating a still further embodiment.
Figure 40:
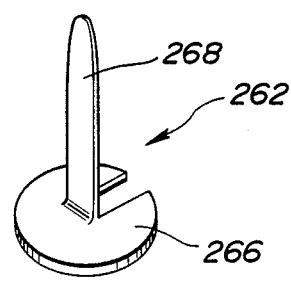
FIG. 40 is a perspective view of an attachment plate.

Referring particularly to FIGS. 39 and 40, the baffle 260 is formed of synthetic resin which may have any one of the previously dectibed constructions. The attachment plate 262 includes a circular support portion 266 and an elongate leg 268 extending from the support portion 266 as best seen in FIG. 40. In mounting, the leg 268 of the attachment plate 262 is inserted through a hole 270 and bent along the corner wall portion 106 and spot welded to the corner wall portion 106 using a work hole 272 formed through the baffle 260. In this embodiment, the support portion 266 presses the baffle 260 deeply enough to conform to the curved shape of the corner wall portion 106.

Figure 41:
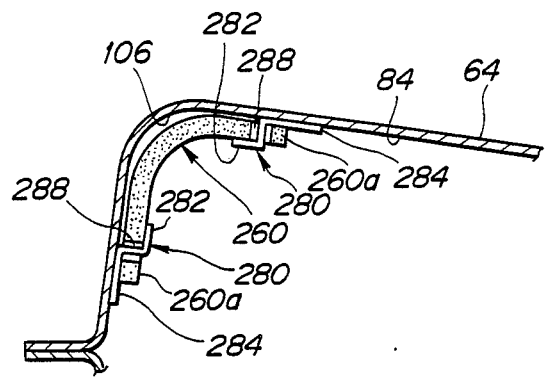
FIG. 41 is a similar view to FIG. 39 illustrating still another embodiment.
Figure 42:
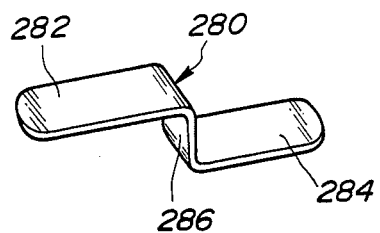
FIG. 42 is a perspective view of an attachment plate.

Referring to FIGS. 41 and 42, a further embodiment is described wherein using a plurality of attachment plates 280 as shown in FIG. 42, the edge portions 260a of a baffle 260 is anchored to the inner wall of an upper shell 64. As best seen in FIG. 42, the attachment plate 280 is formed from an elongate piece of plate and includes a support portion 282 and a leg 284 connecting with the support portion 282 via a vertical connecting portion 286. As will be readily understood from FIG. 41, the attachment plates 280 extend through holes 288 formed through the baffle 260 and have legs 284 spot welded to the inner wall of the coner wall portion 106.

Although in the previously described embodiments in connection with FIGS. 39 and 41, the baffle 260 is biased enough to curve in conformity with the curvature of the corner wall portion 106, it is possible to anchor a baffle 260 such that the baffle can move from the fully drawn illustrated position (in FIG. 43) to the phantom line drawn illustrated position (in FIG. 43) when biased by the fuel within a container of a fuel tank.

Figure 43:
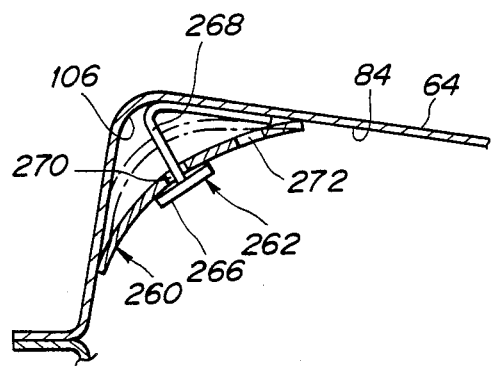
FIG. 43 is a similar view to FIG. 39 illustrating a modification.
Figure 44:
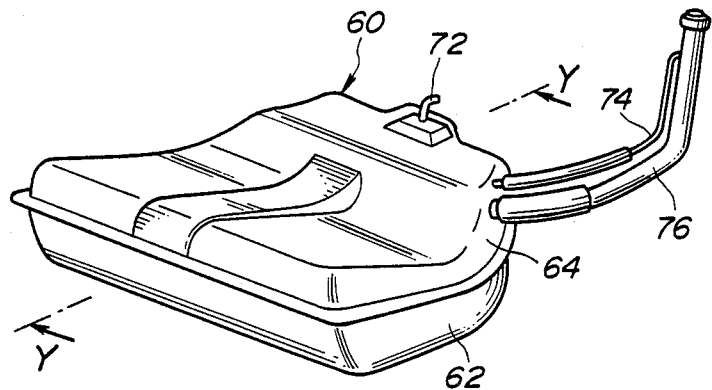
FIG. 44 is a similar view to FIG. 8 illustrating still another embodiment.
Figure 45:
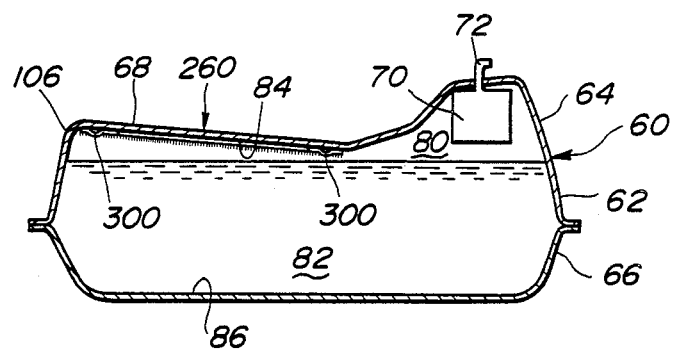
FIG. 45 is a section taken through the line Y—Y in FIG. 44.
Figure 46:
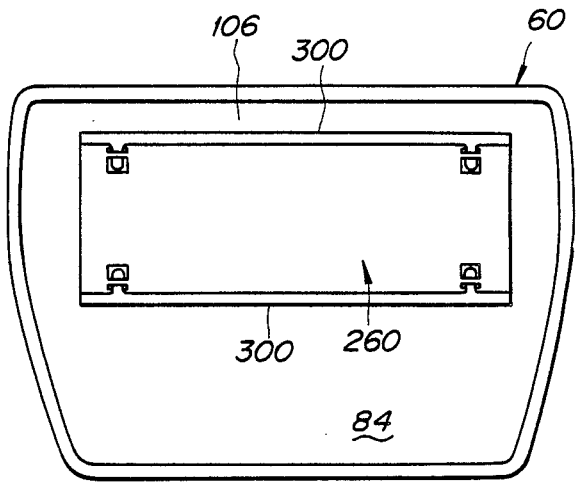
FIG. 46 is a bottom view of an upper shell with a lower shell removed.

Referring to FIG. 43, an attachment plate 262 with a relatively elongated leg 268 is used to anchor the baffle 260 in less stressed manner.

Figure 47:
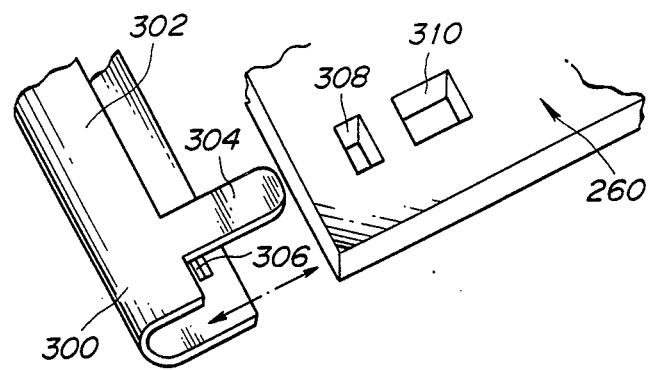
FIG. 47 is a fragmentary exploded view of an attachment plate and a baffle.
Figure 48:
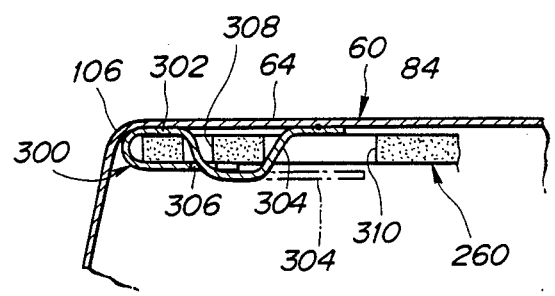
FIG. 48 is a fragmentary section showing the assembled state of the attachment plate and the baffle shown in FIG. 47.
Figure 53:
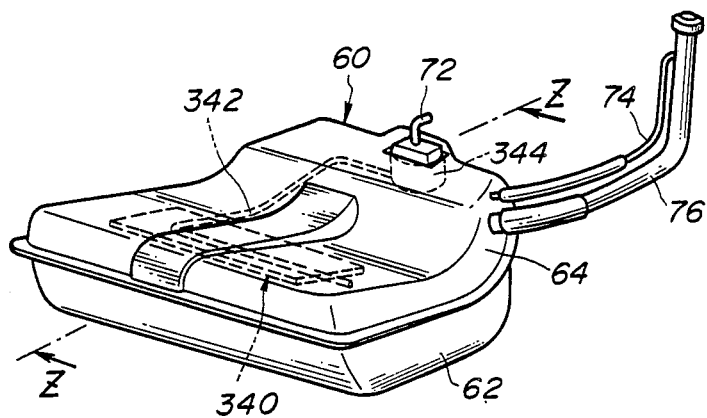
FIG. 53 is a perspective view of a fuel tank illustrating a still another embodiment.
Figure 54:
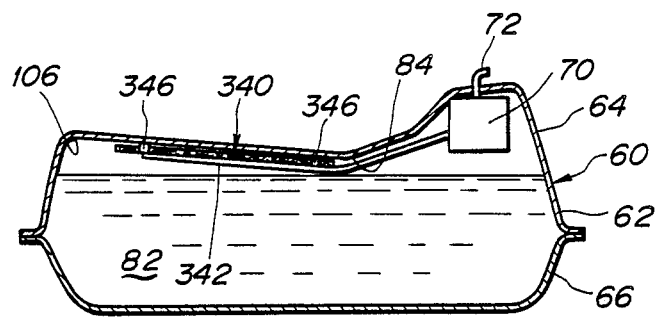
FIG. 54 is a section taken through the line Z—Z in FIG. 53.

Referring now to FIGS. 44 to 48, a still further embodiment is described wherein the present invention is embodied in a fuel tank similar to the before described fuel tank 60 in connection with FIGS. 8 to 10. According to this embodiment, a plate like baffle 210 is mounted on an upper inner wall 84 of a container 62 by means of two attachment plates 300. As best seen in FIG. 47, each of the attachment plates 300 includes a substantially U-shaped edge protecting strip 302 receiving one of the opposite side edges of the baffle 260 and two legs 304 extending from one side of the U of the strip 302. It will be noted that the U-shaped edge protecting strip 300 serves as a support portion corresponding to the counterpart of the previously described attachment plate. The other side of the U of the strip 302 extends further than the first-mentioned side does and is formed with holes 306 for allowing extension of the legs 304 to extend therethrough. The baffle 260 is formed with a hole 308 and a work hole 310. As shown in FIG. 48, with the strip 300 receiving the edge of the baffle 260, the leg 304 is bent to extend through the hole 308, hole 306 and then the work hole 310. Via the work hole 310, the end portion of the leg 304 is spot welded to the inner wall 84 of the upper shell 64.

FIGS. 49 and 50 illustrate a further embodiment wherein an attachment plate 320 as best seen in FIG. 49 is used to mount a baffle 260 formed with a work hole 322. The attachment plate 320 includes a U-shaped edge protecting portion 324 and a leg 326 extending from the edge protecting portion 324. As shown in FIG. 50, the leg 326 extends through the work hole 322 and it is spot welded to the inner wall 84.

FIGS. 51 and 52 illustrate a still further embodiment wherein an attachment hat-like piece 300 with a projected leg portion 322 is used to mount a baffle 260 formed with a work hole 334. As shown in FIG. 52, the projected leg portion 332 extends through the work hole 334 and it is spot welded to an upper inner wall 84 of an upper shell 64.

Figure 55:
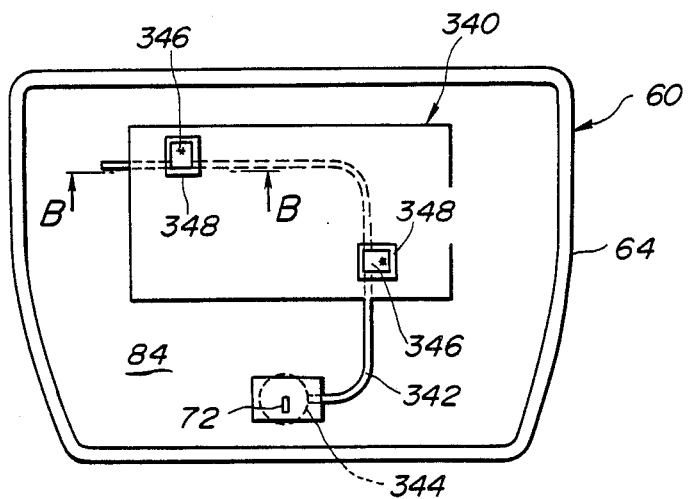
FIG. 55 is a bottom view of an upper shell with a lower shell removed.
Figure 56:
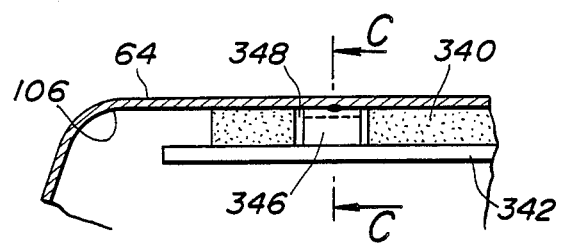
FIG. 56 is a section taken through the line B—B in FIG. 55.
Figure 57:
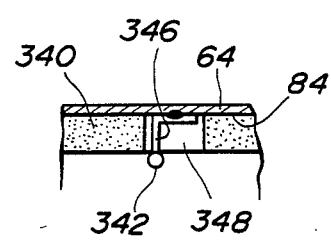
FIG. 57 is a section taken through the line C—C in FIG. 56.

Referring to FIGS. 53 to 58, a still further embodiment is described wherein the present invention is embodied in a fuel tank similar to the before described fuel tank 60 in connection with FIGS. 8 to 10. According to this embodiment, a plate like rectangular baffle 340 is mounted on an upper inner wall 84 of a container 62 by means of piping arrangement usually installed within the container of the fuel tank 60. The tubing arrangement includes a tube 342 extending along the upper inner wall 84. This tube 342 extends from a separator 344 that is fixedly secured to an upper shell 64 along the lower surface of the baffle 340. As shown in FIGS. 55, 56 and 57, L-shaped brackets 346 are secured to the tube 342 at two portions. As readily be understood from FIGS. 56 and 57, the brakets 346 extend through mount holes 348 which the baffle 340 is formed with, and they are spot welded to the upper inner wall 84 of the upper shell 64. The setting is such tghat the tube 342 biases the baffle 340 against the upper inner wall 84 of the upper shell 64.

The baffle 340 may be formed of any one of the previously mentioned constructions.

Figure 58:
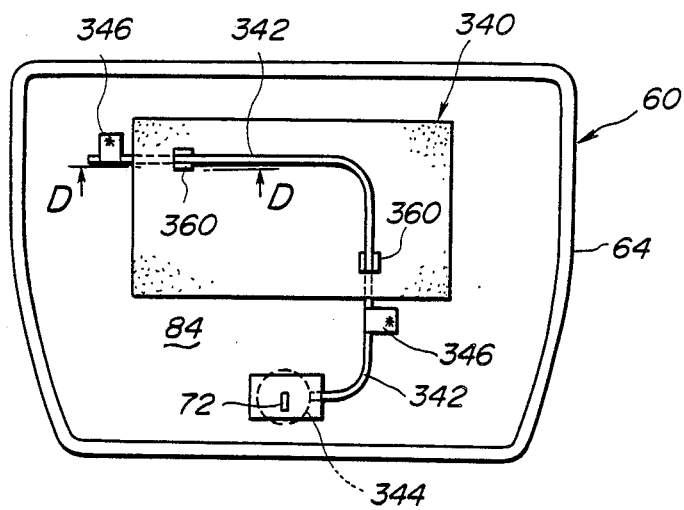
FIG. 58 is a similar view to FIG. 55 illustrating a modification.
Figure 59:
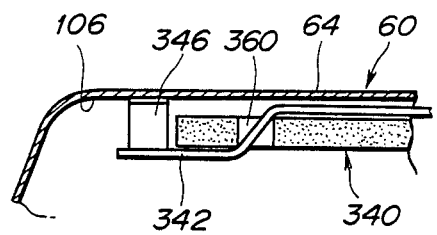
FIG. 59 is a section taken the line D—D in FIG. 58.

FIGS. 58 and 59 show a modification to the embodiment just described. In this embodiment, a baffle 340 is formed with two holes 360 through which a tube 342 extends as shown in FIG. 59 before being fixed relative to an upper inner wall 84 of an upper shell 64 via a L-shaped bracket 346 that is spot welded to the upper inner wall 84.

FIGS. 60, 61 and 62 illustrate a process to increase the intgrity between a baffle 360 and a tube 342. As different from the embodiment described in connection with FIGS. 53 to 57. In this example, the baffle 360 is formed of a number of synthetic resin fibers intermingled. As shown in FIG. 61, a lower half portion 370 with a corrugated surface is connected with the tube 342 and subsequently an upper half portion 372 is connected as shown in FIG. 62 to form a final product. The tube 342 is secured to an upper inner wall 84 of an upper shell 64 in the same manner as the embodiment described in connection with FIGS. 53 to 57.

Lastly, FIG. 63 illustrates a still further embodiment where a baffle 340 is rotatably supported by a tube 342 as different from the embodiment as described in connection with FIGS. 8 to 13.

What is claimed is:

1. A fuel tank, comprising:
   a container having a chamber adapted to receive a body of liquid fuel and wall means defining said chamber; and
   a structure with a number of voids, said structure being so constructed and arranged within said chamber as to provide an arrangement wherein when said structure is exposed to a surface of the body of liquid fuel, waves created on the surface of the body of liquid fuel within the container entrap air in the adjacent voids of said number of voids and compress the air therein, thus dissipating wave energy.

2. The fuel tank of claim 1, wherein said container is formed with projections projecting into the chamber from its associated wall means to engage and thereby limit movement of the structure within the chamber.

3. A fuel tank as claimed in claim 1, wherein said structure extends across the surface of the body of liquid fuel.

4. A fuel tank as claimed in claim 1, wherein said structure has a baffle formed from a sheet made of a number of synthetic resin fibers intermingled.

5. A fuel tank, comprising:
a container having a chamber adapted to receive a body of liquid fuel and wall means defining said chamber; and
a structure with a number of voids, said structure being so constructed and arranged within said chamber as to provide an arrangement wherein when said structure is exposed to the body of liquid fuel, said number of voids work to dissipate energy of the waves created on the surface portion of the body of liquid fuel, wherein said structure has a baffle that is formed from a sheet made of a number of synthetic resin fibers intermingled, said sheet being curved to form a tubular shape.

6. A fuel tank, comprising:
a container having a chamber adapted to receive a body of liquid fuel and wall means defining said chamber; and
a structure with a number of voids, said structure being so constructed and arranged within said chamber as to provide an arrangement wherein when said structure is exposed to the body of liquid fuel, said number of voids work to dissipate energy of the waves created on the surface portion of the body of liquid fuel, wherein said structure has a plurality of looped elastic bands, and a baffle that is formed from a sheet made of a number of synthetic resin fibers intermingled, said sheet encircling said plurality of looped elastic bands to form a tubular shape.

7. A fuel tank as claimed in claim 6, wherein each of said looped elastic bands has a plurality of projections on the outer periphery of its loop, said plurality of projections engages in said baffle to retain said tubular shape.

8. A fuel tank as claimed in claim 7, wherein said structure is held stationary between two opposed walls of said wall means.

9. A fuel tank as claimed in claim 8, wherein said baffle is fixed to said wall means.

10. A fuel tank as claimed in claim 9, wherein said looped elastic bands are compressed to bias said baffle into firm engagement with said wall means.

11. A fuel tank as claimed in claim 1, wherein said structure has a baffle formed from a sheet of synthetic resin, said sheet being formed with a number of meshes.

12. A fuel tank as claimed in claim 1, wherein said structure has a baffle that is formed from a sheet made of a number of synthetic resin fibers intermingled, said sheet being bended with opposite ends thereof meeting with each other.

13. A fuel tank as claimed in claim 12, wherein said structure has a bracket secured to said wall means and rotatably supporting said baffle at one end thereof, and each of said synthetic resin fibers has a specific gravity that is similar to a specific gravity of the liquid fuel, the arrangement being such that a free end of said baffle which is opposite to said one end thereof floats within the surface portion of the body of liquid fuel.

14. A fuel tank as claimed in claim 1 wherein said structure has a baffle that includes a sheet with a surface echinated with a number of synthetic resin needles, and a bracket secured to said wall means and rotatably supporting said baffle at one end thereof.

15. A fuel tank as claimed in claim 4, wherein said structure has a protrusion fixed to said wall means and projecting into said chamber, and wherein said baffle has one side formed with a cutout engaging with said protrusion, and wherein said structure has means for pressing said one side of said baffle into firm engagement with said wall means.

16. A fuel tank as claimed in claim 15, wherein said baffle has another side opposite to said one side, and wherein said container is formed with means for supporting said another side of said baffle.

17. A fuel tank as claimed in claim 16, wherein said baffle covers a portion of said wall means.

18. A fuel tank as claimed in claim 11, wherein said structure has a protrusion fixed to said wall means and projecting into said chamber, and wherein said baffle has one side formed with a cutout engaging with said protrusion, and wherein said structure has means for pressing said one side of said baffle into firm engagement with said wall means.

19. A fuel tank as claimed in claim 18, wherein said baffle has another side opposite to said one side, and wherein said container is formed with means for supporting said another side of said baffle.

20. A fuel tank as claimed in claim 19, wherein said baffle covers a portion of said wall means.

21. A fuel tank as claimed in claim 1, wherein said structure has a baffle made of a sheet of synthetic resin, and an attachment plate including a support portion supporting said baffle and a plurality of legs extending from said support portion and secured to said wall means.

22. A fuel tank as claimed in claim 1, wherein said structure has a baffle made of a sheet of synthetic resin with a surface echniated with a number of synthetic resin needles, and an attachment plate including a support supporting said baffle and a plurality of legs extending from said support portion and secured to said wall means, said baffle being formed with a plurality of through holes which said plurality of legs extend through.

23. A fuel tank as claimed in claim 1, wherein said structure has a baffle formed from a sheet of synthetic resin, said sheet being formed with a number of meshes, and said structure also has an attachment plate including a support portion supporting said baffle and a plurality of legs extending from said support portion and secured to said wall means.

24. A fuel tank as claimed in claim 1, wherein said structure has a baffle formed from a sheet of synthetic resin and an attachment plate including a support portion supporting said baffle and a leg extending from said support portion and secured to said wall means after extending through said baffle.

25. A fuel tank as claimed in claim 24, wherein said baffle is curved to fit a curved coner wall of said wall means and said leg of said attachment plate extends through that portion of the baffle which is curved.

26. A fuel tank as claimed in claim 24, wherein said structure has a baffle formed from a sheet of synthetic resin, and a plurality of attachment plates, each including a support portion supporting said baffle and a leg extending from said support portion and secured to said wall means, said legs of said plurality of attachment plates extending through side edge portions of said baffle with said support portions abutting against said side edges of said baffle.

27. A fuel tank as claimed in claim 1, wherein said structure has a baffle formed from a sheet of synthetic resin and having a first and a second side edges which are opposite to each other, and a plurality of attachment plates, each including a substantially U-shaped edge protecting strip receiving one of said first and second edges, each of said retainer including a plurality of legs extending from said edge protecting strip, said legs of each attachment plate extending through said baffle at that portion of said baffle which is disposed adjacent to the corresponding one of said first and second edges.

28. A fuel tank as claimed in claim 1, wherein said structure has a baffle formed from a sheet of synthetic resin and having a side edge, and an attachment plate including a substantially U-shaped edge protecting portion and a leg extending from said edge protecting portion, said leg of said attachment plate extending through said baffle at that portion of said baffle which is disposed adjacent to the corresponding one of said first and second edges and secured to said wall means.

29. A fuel tank as claimed in claim 1, wherein said structure has a baffle formed from a sheet of synthetic resin and a hat-like attachment piece with a protrusion extending through said baffle plate and secured to said wall means.

30. A fuel tank as claimed in claim 1, wherein said container includes a tubing arrangement, and wherein said structure includes a baffle interposed between said tubing arrangement and said wall means.

31. The fuel tank of claim 1, wherein said structure occupies less than half the volume of the chamber.

32. The fuel tank of claim 7, wherein said projections on said looped elastic bands extend through the baffle so as to be engageable with other projections formed in the wall means of the container.

* * * * *